No. 812,473. PATENTED FEB. 13, 1906.
E. W. ARNOLD.
PROCESS OF TREATING ORES.
APPLICATION FILED SEPT. 14, 1905.
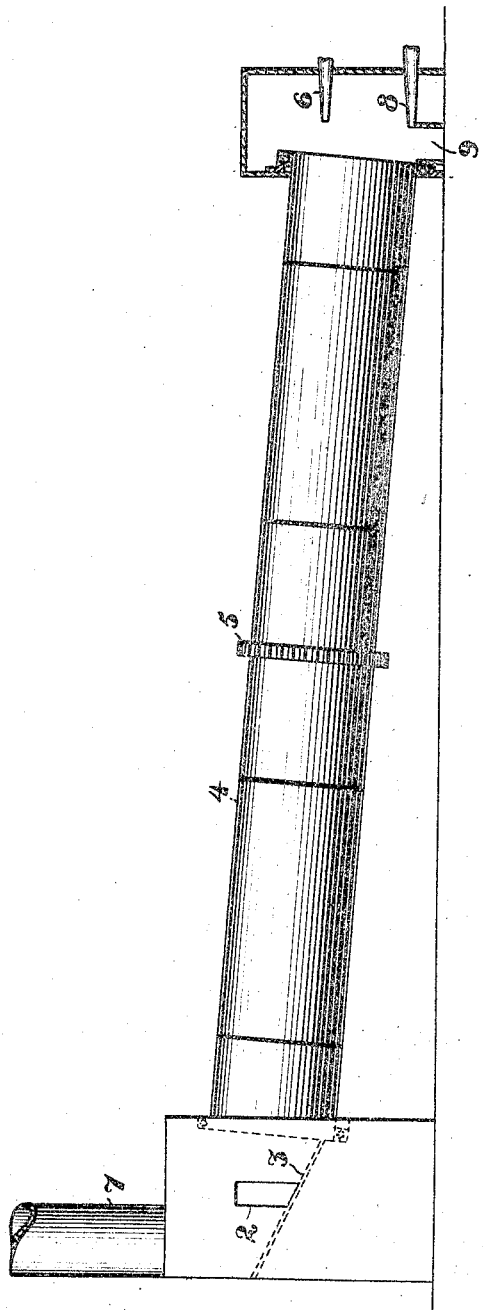
Witnesses:—
Inventor:
Ernest W. Arnold
By Geo. H. Strong.

UNITED STATES PATENT OFFICE.

ERNEST W. ARNOLD, OF SAN FRANCISCO, CALIFORNIA, ASSIGNOR OF ONE-HALF TO VICTOR SELNA, OF SAN FRANCISCO, CALIFORNIA.

PROCESS OF TREATING ORES.

No. 812,473.  Specification of Letters Patent.  Patented Feb. 13, 1906.

Application filed September 14, 1905. Serial No. 278,376.

*To all whom it may concern:*

Be it known that I, ERNEST W. ARNOLD, a citizen of the United States, residing in the city and county of San Francisco and State of California, have invented new and useful Improvements in Processes of Treating Ores, of which the following is a specification.

My invention relates to metallurgy, and especially to the treatment of refractory ores. It is common to roast certain ores containing gold, silver, copper, and other metals to reduce them from their so-called "rebellious" or "refractory" state and to render them free-milling or free-smelting. The methods usually employed are often tedious and unsatisfactory, requiring considerable time and expense and resulting in more or less loss of metal or a more or less incomplete reduction. I have discovered that the reduction is more rapid, satisfactory, and complete if in addition to the roasting and at the same time that the roasting is going on and with the ore at a proper temperature a blast of chlorin gas or a mixture of chlorin gas and charcoal-fumes is directed against the incandescent body of ore.

The drawing represents an apparatus suitable for practicing my invention.

Usually ores containing sulfurets, arsenic, antimony, galena, and certain other substances are not free-milling or free-smelting, but require to be roasted before they will readily or economically yield up their metallic values, such as gold, silver, copper, or iron. In practicing my invention I take the rock just as it comes from the mine and after having it run through a rock-crusher to reduce it to about egg size and subject it to a roasting heat to gradually bring it to incandescence. This is the common practice and results in a very considerable reduction of the ore; but I have discovered if a blast of chlorin gas or, better, a mixture of chlorin gas and charcoal-fumes under suitable pressure is directed upon and into the body of incandescent ore just before its discharge from the furnace that the chlorin or chlorin and charcoal-fumes attack the baser substances of the ore and leave the precious or other unfused metals bright and pure and readily removable.

In the furnace shown in the drawing the ore is fed in at a suitable point, as 2, upon the incline 3, whence is is delivered into the drum 4. The latter is slightly inclined toward its lower end and is of any appropriate size. The interior is lined with fire-brick or like infusible material. It is suitably mounted to rotate and is driven by appropriate means, as indicated at 5. The drum is open at both ends, and an oil-burner 6 is disposed at the lower end of the apparatus, adapted to discharge into the drum and to furnish the necessary heat to roast the ore properly. The upper end of the drum opens into the smoke-stack 7, through which the vapors driven off by the roasting process escape. Suitably arranged adjacent to the discharge end of the drum is a pipe or nozzle 8, through which a blast of chlorin gas or a mixture of chlorin gas and charcoal-fumes may be directed upon the body of ore just before it drops from the drum into the discharge-chute 9.

The drum is usually about thirty feet in length and about twenty inches in diameter, and its rate of rotation and the heat from the burner 6 are such that the ore will take about an hour to traverse the drum from end to end and to become raised to a temperature of incandescence by or before the time it is ready to be discharged from the drum. The gas from the nozzle or nozzles 8 is delivered under a pressure approximately of two atmospheres, more or less. The rotation of the drum keeps the ore constantly agitated, so that the heat and gas have every opportunity of penetrating to all portions of the ore.

This construction of furnace permits the process to be operated continuously and I have used the same and have practised my process with gratifying results as compared with the old process where the chlorin-blast is not used.

Where I use a mixture of chlorin gas and charcoal-fumes I employ about sixty-five per cent. chlorin to thirty-five per cent. of the charcoal-fumes.

Having thus described my invention, what I claim, and desire to secure by Letters Patent, is—

1. The treatment of refractory ores which comprehends the roasting of the ore to incandescence, and the direction of a blast impregnated with chlorin gas against and into the body of ore, while in an incandescent state.

2. The treatment of refractory ores which comprehends the heating of the ore to incandescence, and the direction of a blast of chlorin gas and charcoal-fumes upon and into a body of ore, while the latter is in a state of incandescence.

3. The treatment of refractory ores which comprehends heating the ore to incandescence by directing a blast of a suitable hydrocarbon thereagainst, and then impregnating the incandescent ore with chlorin gas.

4. The treatment of refractory ores which comprehends heating the ore to incandescence and while it is in motion by directing a blast of a suitable hydrocarbon into and against said ore, and then impregnating the incandescent ore with a mixture of chlorin gas and charcoal-fumes.

5. The treatment of refractory ores which comprehends the heating of a body of ore to incandescence by directing into and against the ore a blast of a suitable hydrocarbon, and impregnating the incandescent ore with a mixture of chlorin gas and charcoal-fumes, in the proportion of about two parts of chlorin to one part of charcoal-fumes.

In testimony whereof I have hereunto set my hand in presence of two subscribing witnesses.

ERNEST W. ARNOLD.

Witnesses:
S. H. NOURSE,
T. CASTBERG.